United States Patent [19]

Forster et al.

[11] 4,173,889

[45] Nov. 13, 1979

[54] ULTRASONIC FLOWMETER

[75] Inventors: Michel Forster; Pierre Rampin, both of Valence, France

[73] Assignee: Crouzet, Paris, France

[21] Appl. No.: 888,250

[22] Filed: Mar. 20, 1978

[30] Foreign Application Priority Data

Mar. 25, 1977 [FR] France ............................... 77 09251

[51] Int. Cl.² .............................................. G01F 1/66
[52] U.S. Cl. ............................................... 73/194 A
[58] Field of Search .............................. 73/194 A, 644

[56] References Cited

U.S. PATENT DOCUMENTS

| 2,669,121 | 2/1954 | Garman et al. | 73/194 A |
| 3,906,791 | 9/1975 | Lynnworth | 73/194 A |
| 4,004,461 | 1/1977 | Lynnworth | 73/194 A |

FOREIGN PATENT DOCUMENTS 313572  11/1971  U.S.S.R. ................................ 73/194 A

Primary Examiner—Charles A. Ruehl
Attorney, Agent, or Firm—Holman & Stern

[57] ABSTRACT

An ultrasonic flowmeter for measuring the rate of flow of a fluid, comprising a conduit and two acoustic probes placed on a line inclined with respect to the axis of said conduit. The active end of the probes are bathing in an annular chamber formed by a sleeve extending the inner wall of the conduit in the measuring zone and a swell in the inner wall of the conduit, and in which the fluid may penetrate.

2 Claims, 1 Drawing Figure

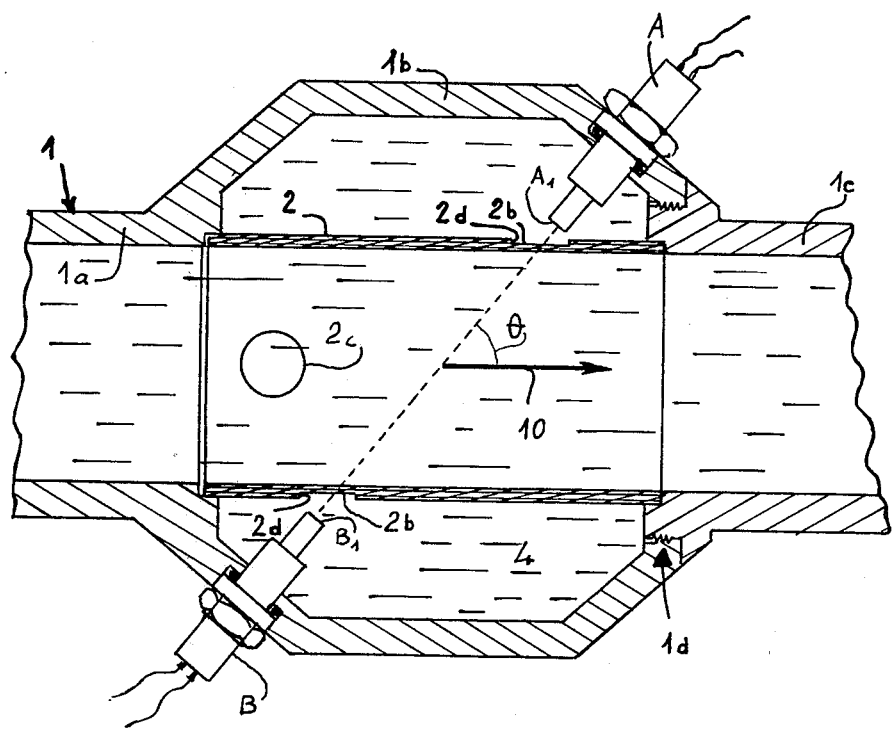

ULTRASONIC FLOWMETER

FIELD OF THE INVENTION

The present invention relates to an ultrasonic flowmeter for measuring the rate of flow of a fluid, comprising a conduit in which the fluid flows, at least two acoustic probes placed outside the flow of fluid on a line inclined with respect to the axis of the conduit, the active end of the probes bathing in a recess in which the fluid, of which the rate of flow is to be measured, may penetrate without circulating therein, the recess being constituted by a discontinuity, in the measuring zone, of the inner wall of the conduit, and means, through which the fluid may pass, provided to extend, said inner wall in said zone and thus ensure the continuity of the flow of fluid.

BACKGROUND OF THE INVENTION

Ultrasonic flowmeters are already known which comprise two acoustic probes disposed on a line inclined with respect to the axis of a conduit in which flows a fluid whose rate of flow is to be measured, these two probes functioning successively as transmitters then receivers. These probes are cylindrical in form and their active end, in intimate contact with the fluid, either penetrates directly in the flow of fluid, or is recessed with respect to the inner surface of the conduit.

In the first case, where the active end of the probes penetrates directly in the flow of fluid, the probes may be damaged by a solid body taken along by the fluid. Furthermore, the end of the probes may disturb the flow of the fluid and provoke a phenomenon of cavitation causing the appearance, at this end, of a gaseous cushion harmful to the acoustic transmission.

In the second case, where the active end of the probes is recessed with respect to the inner surface of the conduit, an air bubble may be trapped in front of the end of the probes, when the corresponding flowmeters are filled, which may prevent any acoustic transmission. Furthermore, still in this latter case, when the fluid is a cryogenic fluid, a possible temperature gradient on the wall of the conduit may provoke the vaporisation of the fluid and consequently further prevent the acoustic transmission.

Different solutions to these problems of flowmeters have already been proposed, particularly in French Pat. Nos. 1,245,961 and 1,604,378 and U.S. Pat. No. 3,906,791, said latter describing, column 7, line 65 to column 8, line 17, with reference to FIG. 11, an ultrasonic flowmeter of the type mentioned hereinabove, in which the flow is not disturbed and in which any temperature gradient on the screen constituting said means ensuring continuity of the flow of fluid is virtually eliminated since both sides of this screen bathes in the same fluid.

However, the flowmeter of U.S. Pat. No. 3,906,791 in fact comprises two recesses which, in addition, are constituted by bores formed in the thickness of the wall of the conduit. Now, the piercing of these bores is a costly operation, and the fact that the conduit is provided with these two separate recesses, and therefore with two screens associated therewith, does not ensure a total absence of temperature gradient.

It is therefore an object of the present invention to remedy the above-mentioned drawbacks.

SUMMARY OF THE INVENTION

To this end, the flowmeter of the type mentioned hereinabove is characterized, according to the invention, in that said discontinuity of the inner wall of the conduit is a swell forming with said means an annular chamber.

Apart from the fact that the conduit according to the invention is now provided only with one annular recess, the swell in question may be obtained without supplementary machining of the conduit, this considerably reducing the cost of manufacture of the flowmeter according to the invention, with respect to the piercing of the two separate recesses of the known flowmeter.

The invention also provides such a flowmeter with a sleeve arranged to ensure, in the measuring zone, the continuity of the flow of fluid, the thickness of this sleeve, opposite each of the probes, being weakened, and slots to allow the fluid to pass in said annular chamber being provided in the sleeve.

BRIEF DESCRIPTION OF THE DRAWING

The invention will be more readily understood on reading the following description with reference to the accompanying drawing, in which:

The single FIGURE shows the flowmeter according to the invention in axial section.

DETAILED DESCRIPTION OF A PREFERRED EMBODIMENT

Referring now to the drawing, the flowmeter shown in the FIGURE comprises a cylindrical conduit 1 in which flows a fluid whose rate of flow is to be measured, and which is formed of two parts 1a and 1c connected together by screwing part 1c in part 1a at 1d. The part 1a of the conduit comprises, near its end for connection to part 1c, a discontinuity formed by a swell 1b substantially cylindrical and coaxial with respect to the part 1a of the conduit 1, and of diameter notably larger than that of this conduit part 1a.

A cylindrical sleeve 2, of inner diameter equal to that of the conduit parts 1a and 1c, is disposed inside the conduit 1, in the zone of the swell 1b, and coaxially with respect to the conduit parts 1a and 1c, in order to extend the inner surface of the conduit 1 and thus ensure the continuity of the flow of fluid in the zone of this swell.

The recess between the inner face of the swell 1b and the outer face of the sleeve 2 forms an annular chamber 4.

Two conventional acoustic probes A and B are fixed to the swell 1b, their active ends $A_1$ and $B_1$ being disposed inside the annular chamber 4 and consequently outside the flow of fluid, on a line inclined by an angle $\theta$ with respect to axis 10 of the conduit 1.

The sleeve 2 has two zones 2b, opposite the two active ends $A_1$ and $B_1$ of the two probes A and B, the wall of which is substantially thinned to facilitate the acoustic transmission between the probes. Moreover, openings, or slots, 2c are made in the wall of the sleeve 2 through which the fluid may pass to penetrate into the annular chamber 4 and thus bathe the probes. It should be noted that, although the fluid can penetrate in this annular chamber 4, it cannot circulate therein. Finally, the openings 2c of the sleeve 2 are made outside of the section 2b—2b of acoustic transmission, to avoid the micro-perturbations which occur at these openings affecting the measurements.

The sleeve 2 may advantageously be constituted by a cylinder made of steel provided with two openings 2d, and coated, for example by electroforming, with a film of nickel stopping these two openings 2d to form thin membranes in the two thinned zones 2b. The thickness of the nickel film depends on the wave length of the acoustic signals used, which itself depends on the nature of the fluid passing through the flowmeter.

A conventional drain cock, not shown, communicates with the upper part of the annular chamber 4, in order to be able, when the hydraulic conduit is filled, to eliminate the air pocket occupying the volume of this chamber before the fluid arrives therein.

The flowmeter of the invention, shown in the FIGURE, functions in the same way as conventional known flowmeters and, as the functioning is in no way a feature of the invention, it will not be described.

The flowmeter of the invention has a structure which naturally avoids any perturbation in the flow of fluid and eliminates any effect of temperature gradient at the wall of the sleeve of which the two, inner and outer, faces bathe in the same fluid. In the case of a cryogenic fluid, the possible phenomena of vaporization are displaced out of the measuring zone of the probes.

In addition, the flowmeter of the invention, of which the discontinuity forming the recess for receiving the probes, may be obtained without supplementary machining of the conduit, and for example as cast, may be manufactured at a relatively low cost.

Having described the invention, various other modifications and improvements will occur to those skilled in this art. The definition of the invention is therefore included in appended claims.

What is claim is:

1. An ultrasonic flowmeter for measuring the rate of flow of a fluid, comprising:
    a conduit in which said fluid flows;
    at least two acoustic probes placed outside the flow of fluid on a line inclined with respect to the axis of said conduit, said probes having an active end disposed in a recess in which the fluid, of which the rate of flow is to be measured, may penetrate without circulating therein, said recess being constituted by a discontinuity, in a measuring zone, of the inner wall of the conduit; and
    a sleeve disposed in said discontinuity provided with openings through which the fluid may pass, said sleeve having an internal diameter essentially equal to an internal diameter of said conduit for ensuring continuity of the flow of fluid, said conduit comprising a first conduit part and a second conduit part, said first and second conduit parts threadably interconnected, said first part comprising, near said threadable connection, a swell, said swell comprising said discontinuity and in combination with said sleeve, forming an annular chamber.

2. A flowmeter according to claim 1, wherein the thickness of said sleeve is reduced opposite each of said probes and said sleeve is made of steel with electroformed nickel film forming a thin membrane to comprise the reduced thickness of said sleeve.

* * * * *